(12) United States Patent
Krick et al.

(10) Patent No.: US 9,296,332 B2
(45) Date of Patent: Mar. 29, 2016

(54) DEVICE FOR CONTROLLING A PLURALITY OF SETS OF LEDS, ESPECIALLY FOR AN AUTOMOTIVE VEHICLE

(71) Applicant: VALEO VISION, Bobigny (FR)

(72) Inventors: Sebastian Krick, Paris (FR); Marc Duarte, Villemomble (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 14/514,538

(22) Filed: Oct. 15, 2014

(65) Prior Publication Data

US 2015/0102723 A1    Apr. 16, 2015

(30) Foreign Application Priority Data

Oct. 15, 2013 (FR) ...................................... 13 60009

(51) Int. Cl.
| | |
|---|---|
| *B60Q 3/00* | (2006.01) |
| *H05B 33/08* | (2006.01) |
| *B60Q 1/00* | (2006.01) |

(52) U.S. Cl.
CPC .. *B60Q 3/00* (2013.01); *B60Q 1/00* (2013.01); *H05B 33/0812* (2013.01); *H05B 33/0815* (2013.01); *H05B 33/0827* (2013.01); *H05B 33/0842* (2013.01)

(58) Field of Classification Search
CPC ............. H05B 33/083; H05B 33/0827; H05B 33/0815; H05B 33/0812; H05B 33/0842; H05B 37/02; B60Q 1/1423; B60Q 2400/30; B60Q 3/00; B60Q 1/00

See application file for complete search history.

(56) References Cited

U.S. PATENT DOCUMENTS

| | | | |
|---|---|---|---|
| 7,173,375 B2 | 2/2007 | Takeda et al. | |
| 7,659,670 B2 * | 2/2010 | Asada | ............................. 315/82 |
| 7,888,876 B2 | 2/2011 | Kitagawa et al. | |
| 8,525,416 B2 | 9/2013 | Roger et al. | |
| 8,907,576 B2 * | 12/2014 | Ferrier | .......................... 315/186 |
| 2004/0179366 A1 | 9/2004 | Takeda et al. | |
| 2009/0026958 A1 | 1/2009 | Kitagawa et al. | |
| 2011/0025230 A1 * | 2/2011 | Schulz et al. | .................. 315/294 |
| 2011/0037396 A1 * | 2/2011 | Chien et al. | ................ 315/185 R |

(Continued)

FOREIGN PATENT DOCUMENTS

FR    2959181 A1    10/2011

*Primary Examiner* — Vibol Tan
(74) *Attorney, Agent, or Firm* — Jacox, Meckstroth & Jenkins

(57) ABSTRACT

A control device for controlling a plurality of sets of LEDs, especially for an automotive vehicle, the plurality of sets of LEDs comprising at least a first set that is associated with at least a first lighting and/or signaling function and a second set that is associated with at least a second and third function. The control device comprises an electrical power source able to be connected, especially in parallel, to the first set and to the second set of LEDs and to deliver at least two different electrical power levels suitable for the first and second lighting and/or signaling function, respectively, a switching module able to be connected, especially in series, with the first set of LEDs and to switch between a first position, especially an open position, in which only the second set of LEDs is supplied with electrical power, and a second position, especially a closed position, in which the first set and the second set of LEDs are supplied with electrical power simultaneously and a module for regulating electrical current able to be connected, especially in series, with the second set of LEDs and to switch between a regulating position enabling adjustment of a third electrical power level suitable for a third lighting and/or signaling function and a short-circuit position.

19 Claims, 1 Drawing Sheet

(56) References Cited

U.S. PATENT DOCUMENTS

| | | |
|---|---|---|
| 2011/0260615 A1 | 10/2011 | Roger et al. |
| 2013/0038234 A1* | 2/2013 | Van Der Veen et al. ...... 315/224 |
| 2013/0207559 A1* | 8/2013 | Ferrier .......................... 315/192 |
| 2014/0253056 A1* | 9/2014 | Hu et al. ....................... 323/205 |
| 2014/0361623 A1* | 12/2014 | Siessegger et al. ............. 307/64 |

* cited by examiner

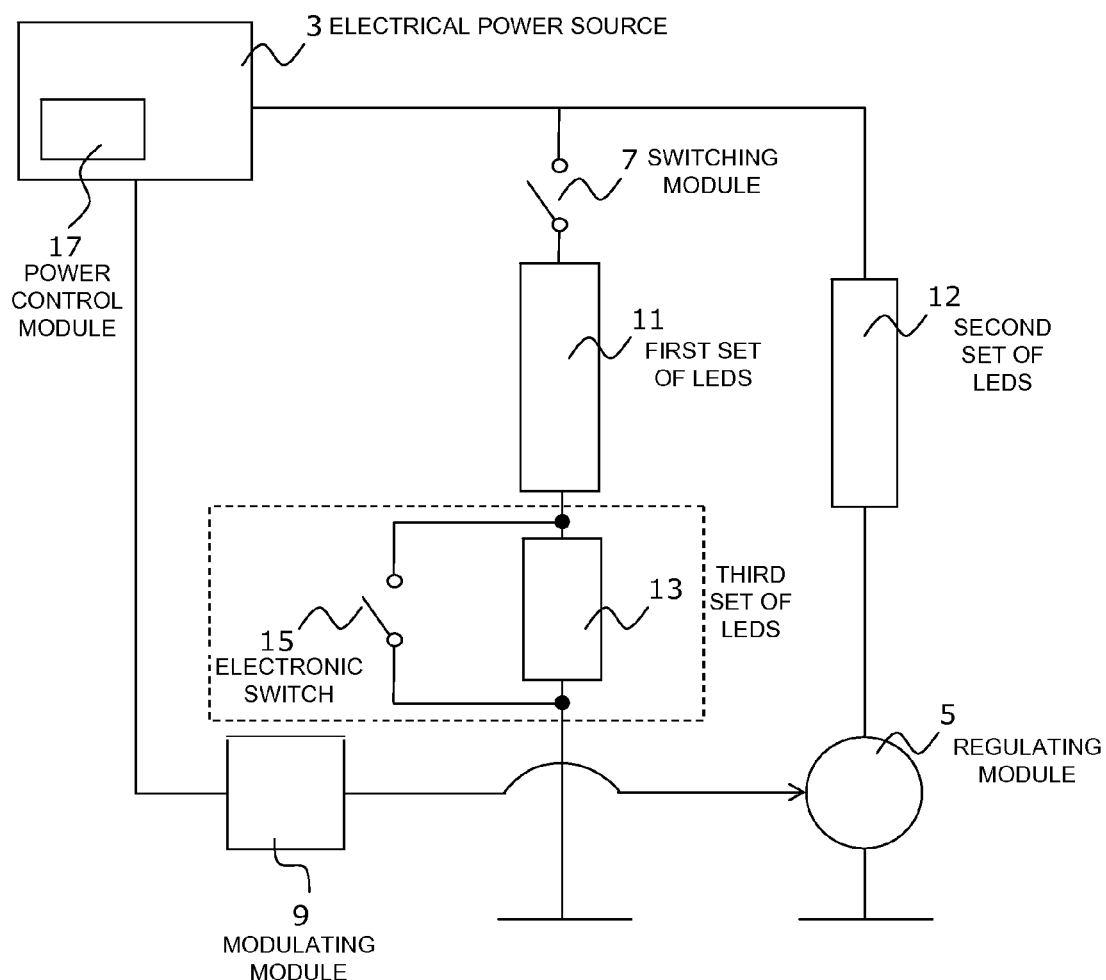

DEVICE FOR CONTROLLING A PLURALITY OF SETS OF LEDS, ESPECIALLY FOR AN AUTOMOTIVE VEHICLE

CROSS-REFERENCE TO RELATED APPLICATIONS

This application claims priority to French Application No. 1360009 filed Oct. 15, 2013, which application is incorporated herein by reference and made a part hereof.

BACKGROUND OF THE INVENTION

1. Field of the Invention

The present invention relates to a control device for controlling a plurality of sets of light-emitting diodes (LEDs) associated with lighting and/or signaling functions of an automotive vehicle.

2. Description of the Related Art

In automotive vehicles, a plurality of sets of LEDs are installed, each set of LEDs having a specific lighting and/or signaling function. Among the many functions implemented in automotive vehicles, mention may be made, by way of nonlimiting example, of low beam (LB), position light (PL) and daytime running light (DRL) functions. Many other functions, such as brake light functions or turn indicator functions, are implemented with sets of LEDs, which may be located at the front, back or on the sides of automotive vehicles.

The aforementioned functions and the sets of LEDs themselves are subject to strict regulation of their parameters, among which the minimum and/or maximum light intensity, the electrical power required to execute each of the functions and the distribution of the light intensity for road lighting functions, depending on traffic conditions.

These sets of LEDs must therefore be supplied with electrical power in accordance with the standards and regulations in force and may be turned on or off in succession or simultaneously. For example, the LB and PL functions are provided to be turned on simultaneously. Furthermore, the sets of LEDs and their associated controls must be integrated into vehicles with the smallest possible bulk.

Document FR 2 959 181 A1, which is equivalent to U.S. Patent Publication 2011/0260615, which is now issued as U.S. Pat. No. 8,525,416, describes a known device for controlling sets of LEDs, in which means for modulating electrical power level, multiplexing means and demultiplexing means allow different electrical power levels to be distributed and delivered to sets of LEDs in relation to the respective associated functions.

However, this type of architecture does not allow low currents, which are obligatory for certain functions, especially signaling functions, to be fixed with precision. Furthermore, the bulk of these devices remains to be optimized.

SUMMARY OF THE INVENTION

The objective of the present invention is to remedy the aforementioned drawbacks by providing a simple and compact architecture for a control device for controlling a plurality of sets of LEDs, with a perfect control of low currents.

The present invention meets this objective by providing a control device for controlling a plurality of sets of LEDs, especially for an automotive vehicle, the plurality of sets of LEDs comprising at least a first set of LEDs that is associated with at least a first lighting and/or signaling function and a second set of LEDs that is associated with at least a second and third lighting and/or signaling function. The control device comprises an electrical power source able to be connected, especially in parallel, to the first set of LEDs and to the second set of LEDs and to deliver at least two different electrical power levels suitable for the first lighting and/or signaling function and for the second lighting and/or signaling function, respectively. The control device also comprises a switching module able to be connected, especially in series, with the first set of LEDs and to switch between a first position, especially an open position, in which only the second set of LEDs is supplied with electrical power, and a second position, especially a closed position, in which the first set of LEDs and the second set of LEDs are supplied with electrical power simultaneously. The control device furthermore comprises a module for regulating electrical current able to be connected, especially in series, with the second set of LEDs and to switch between a regulating position enabling adjustment of a third electrical power level suitable for a third lighting and/or signaling function and a short-circuit position.

The expression "set of LEDs that is associated with a function" is understood to mean that the set of LEDs is arranged to generate, for example using optical means belonging to said set, said function. The lighting and/or signaling functions are preset regulatory photometric functions. Each set of LEDs is able to generate all of the one or more functions that are associated therewith.

Supplying the second set of LEDs with electrical power allows the second lighting and/or signaling function to be generated in its entirety. Similarly, simultaneously supplying electrical power to the first and second sets of LEDs allows both the first and the third lighting and/or signaling functions to be generated in their entirety.

The regulating module may also switch to an open position so that only the first set of LEDs is supplied for the first function.

According to one embodiment of the invention, a control signal originating from the electrical power source is used to switch the module for regulating electrical current between the regulating position and the short-circuit position.

Preferably, the electrical power source comprises an electrical power source providing a voltage that is adjustable to at least two different current levels corresponding to the at least two different electrical power levels, respectively. According to one variant, the adjustable voltage electrical power source comprises a DC/DC voltage converter.

According to one embodiment, the module for regulating electrical current comprises an adjustable current source, the device furthermore comprising a modulating module connected, especially in series, between the electrical power source and the adjustable current source, the modulating module being able to control the adjustable current source in order to adjust the third electrical power level.

Advantageously, the regulating module delivers a signal for controlling the adjustable current source, the controlling signal being pulse-width modulated and having a duty cycle chosen so that the current source adjusts the third electrical power level.

If needs be, the duty cycle is chosen so that the current flowing through the second set of LEDs is higher than a nominal value, especially 100 mA, while guaranteeing that the light flux emitted by the LEDs of the second set does not exceed a regulatory approved maximum value.

In the automotive field, the LEDs are generally arranged to emit a light flux that is proportional to the current flowing through them, when this current is higher than a nominal value, for example 100 mA. This is not the case when this current is lower than the nominal value. However, in the case of certain photometric functions, the maximum authorized power requires a current that is much lower than this value. The aforementioned feature therefore has the advantage of allowing the LEDs to be supplied with an electrical current guaranteeing the luminous performance thereof perfectly predictable while ensuring the photometric function remains in regulatory conformance.

According to one variant, the module for regulating electrical current comprises a linear current source.

According to one embodiment of the invention, the plurality of sets of LEDs furthermore comprises a third set of LEDs able to be connected in series to the first set of LEDs in order to form a fourth set of LEDs associated with a fourth lighting and/or signaling function.

Advantageously, the device furthermore comprises an electronic switch able to be connected, especially in parallel, to the third set of LEDs and able to switch into a position, especially a closed position, enabling control of the first lighting and/or signaling function and into a position, especially an open position, enabling control of the fourth lighting and/or signaling function.

The first lighting and/or signaling function may be a low beam function, the second function a daytime running light function and the third function a position light function.

According to another example, the first lighting and/or signaling function may be a fog light function, the second function a daytime running light function, the third function a position light function and the fourth function a low beam function.

The fourth lighting and/all signaling function may be a high beam function or a low beam function.

According to one embodiment, the switching module is connected between the electrical power source and the first set of LEDs.

According to one variant, the switching module is connected between the first set of LEDs and a reference potential.

The invention and its advantages will be better understood on reading the following description of one embodiment and of one nonlimiting example of implementation of the invention, given with reference to the appended drawing, in which:

BRIEF DESCRIPTION OF THE ACCOMPANYING DRAWINGS

FIG. 1 schematically illustrates one embodiment of a control device for controlling a plurality of sets of LEDs, according to the subject matter of the present invention.

DETAILED DESCRIPTION OF THE PREFERRED EMBODIMENTS

FIG. 1 shows a control device for controlling a plurality of sets of LEDs according to one possible embodiment of the invention. The control device is especially suitable for implementation in an automotive vehicle. The plurality of sets of LEDs comprises at least a first set 11 of LEDs and a second set 12 of LEDs in two parallel branches. The first set 11 of LEDs is associated with a first lighting and/or signaling function. The second set 12 of LEDs is associated with a second and a third lighting and/or signaling function. Thus, a single set of LEDs may be used for two lighting and/or signaling functions, while retaining only one single supply circuit.

The control device according to the embodiment comprises an electrical power source 3 that is intended to be connected in parallel to each branch comprising the first set 11 of LEDs and the second set 12 of LEDs. The electrical power source 3 delivers at least two different electrical power levels. The electrical power levels are in direct relation to the function or functions associated with each set 11, 12 of LEDs. The electrical power source 3 is especially suitable for delivering an output voltage $U_{out}$ and a corresponding output current $I_{out}$ in order to provide the required electrical power level. The electrical power source 3 may be supplied by a voltage source (not shown) of the vehicle such as the battery of the vehicle.

The electrical power source 3 for example comprises an electrical power source providing a voltage that is adjustable to at least two different current levels, in which the different current levels correspond to the two different electrical power levels, respectively. More specifically, the electrical power source 3 may advantageously consist of a DC/DC voltage converter, the latter being supplied by the battery of the vehicle. The value of the output voltage of the electrical power source 3 may be lower than, higher than or similar to the voltage value delivered by the battery of the vehicle.

Preferably, the electrical power source 3 also comprises a power control module 17 for selecting the electrical power level in relation to the requested lighting and/or signaling function.

The device according to the embodiment also comprises a switching module 7. The switching module 7 is connected in series with the first set 11 of LEDs, and may switch between an open position, in which only the second set 12 of LEDs is supplied with electrical power, and a closed position, in which the first and second sets 11, 12 of LEDs are supplied with electrical power simultaneously. Thus, in the open position, only the second lighting and/or signaling function is active, whereas in the closed position, the first and third lighting and/or signaling functions are active simultaneously. The control device according to the invention therefore has a very simple and compact architecture.

In the embodiment shown in FIG. 1, the switching module 7 is connected between the electrical power source 3 and the first set 11 of LEDs. It may also be connected between the first set 11 of LEDs and a reference potential.

Furthermore, the device comprises a module 5 for regulating electrical current connected in series with the second set 12 of LEDs. The module 5 for regulating electrical current may switch between a regulating position and a short-circuit position. In the regulating position, the regulating module 5 adjusts the electrical power delivered to the second set 12 of LEDs in order to obtain a third electrical power level. This third electrical power level is in direct relation to the third lighting and/or signaling function. The electrical power is adjusted by the regulating module 5 by limiting and stabilizing the electrical current passing through the second set 12 of LEDs.

The voltage across the terminals of each branch generally depends on the number and/or type of LEDs used in the sets of LEDs included in the branches. The regulating module 5 allows the voltages across the first set 11 of LEDs on the one hand and across the second set 12 of LEDs on the other hand to be balanced.

When the module 5 for regulating electrical current is in the short-circuit position, the current passing through the second set 12 of LEDs corresponds to the level of the electrical power delivered by the electrical power source 3 to the second set 12 of LEDs. A control signal originating from the electrical power source 3, and especially from the electrical power control module 17, is used to switch the regulating module 5 between the regulating position and the short-circuit position.

Specifically, the regulating module 5 may advantageously consist of an adjustable current source, the device furthermore comprising a modulating module 9 connected in series between the electrical power source 3 and the adjustable current source, the modulating module 9 being able to control the adjustable current source in order to adjust the third electrical power level. Alternatively, the module 5 for regulating electrical current may be a linear current source. For example, the regulating module 5 may be controlled by the power control module 17, either via a DC signal or by means of a pulse-width modulation (PWM), represented by the modulating module 9.

FIG. 1 also shows a third set 13 of LEDs, forming part of the plurality of sets of LEDs. The third set 13 of LEDs is connected in series to the first set 11 of LEDs. Thus, the first set 11 of LEDs and the third set 13 of LEDs form a fourth set of LEDs being associated with a fourth lighting and/or signaling function. The control device, according to one embodiment, comprises an electronic switch 15 connected in parallel to the third set 13 of LEDs. The electronic switch 15 may switch to a closed position enabling control of the first lighting and/or signaling function and into an open position enabling control of the fourth lighting and/or signaling function, respectively, simultaneously with the third lighting and/or signaling function. The electronic switch 15 may consist of a transistor.

One example implementation of the control device according to invention will be described below. The electrical power source 3 is a DC/DC voltage converter supplied by a voltage of about 12 to 14 V delivered by the battery of the automobile. Typically, an LED of one of the sets 11, 12, 13 of LEDs requires about 3 to 4 V to operate.

According to the example, the first set 11 of LEDs is associated with the LB (low beam) function. The second set 12 of LEDs is associated with the DRL (daytime running light) and PL (position light) functions. When the switching module 7 is open, the second set 12 of LEDs is supplied with electrical power, and the DC/DC voltage converter 3 adjusts the output voltage $U_{out}$ and the corresponding output current $I_{out}$ in order to deliver the electrical power level required for the DRL function. Typically, a set of LEDs having the DRL function comprises 5 or 6 LEDs. The output voltage is therefore about 20 to 24 V. The output current, $I_{out}=I_{DRL}$, is about 200 mA.

When the switching module 7 is closed, the first set 11 of LEDs is supplied with electrical power, and the converter 3 adjusts the output voltage $U_{out}$ and the corresponding output current $I_{out}$ in order to deliver the electrical power level required for both the LB and PL functions. The output current is then written $I_{out}=I_{LB}+I_{PL}$, where $I_{PL} \ll I_{LB}$, the LB function only requiring a very low electrical current. For example, $I_{LB}$ is about 1 A, and $I_{PL}$ is about 20 mA. In this case, the regulating module, which may, as indicated above, be a linear or adjustable current source, limits and stabilizes the current $I_{PL}$ to about 20 mA. Typically, a set of LEDs having the LB function contains 8 LEDs. The output voltage is therefore about 32 V. For the PL function, the same set of LEDs is used as for the LB function.

The control device according to the invention may be implemented with other lighting and/or signaling functions than those mentioned in the example described above. Specifically, the control device according to the invention is particularly well suited when there is a need to control simultaneously various lighting and/or signaling functions requiring various electrical powers having very different electrical current ratios, while balancing the voltages in the branches of the control device by virtue of the electrical current regulating module.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A control device for controlling a plurality of sets of LEDs, especially for an automotive vehicle, the plurality of sets of LEDs comprising at least a first set of LEDs that is associated with at least a first lighting and/or signaling function and a second set of LEDs, said second set of LEDs being capable of generating at least a second and third lighting and/or signaling function, the control device comprising:
　　an electrical power source able to be connected, especially in parallel, to the at least a first set of LEDs and to the second set of LEDs and to deliver at least two different electrical power levels suitable for the first lighting and/or signaling function and for the second lighting and/or signaling function, respectively;
　　a switching module able to be connected, especially in series, with the at least a first set of LEDs and to switch between a first position, especially an open position, in which only the second set of LEDs is supplied with electrical power, and a second position, especially a closed position, in which the at least a first set of LEDs and the second set of LEDs are supplied with electrical power simultaneously; and
　　a module for regulating electrical current, said module being connected in series with the second set of LEDs and is adapted to switch between a regulating position during which electrical power to said second set of LEDs is adjusted to a third electrical power level so that said second set of LEDs performs a third lighting and/or signaling function and a short-circuit position during which current passing through said second set of LEDs corresponds to the level of electrical power delivered by the electrical power source to said second set of LEDs;
　　in which a control signal originating from the electrical power source is used to switch the module for regulating electrical current between the regulating position and the short-circuit position.

2. The control device according to claim 1, in which the electrical power source comprises an electrical power source providing a voltage that is adjustable to at least two different current levels corresponding to said at least two different electrical power levels, respectively.

3. A control device for controlling a plurality of sets of LEDs, especially for an automotive vehicle, the plurality of sets of LEDs comprising at least a first set of LEDs that is associated with at least a first lighting and/or signaling function and a second set of LEDs, said second set of LEDs being capable of generating at least a second and third lighting and/or signaling function, the control device comprising:
　　an electrical power source able to be connected, especially in parallel, to the at least a first set of LEDs and to the second set of LEDs and to deliver at least two different electrical power levels suitable for the first lighting and/or signaling function and for the second lighting and/or signaling function, respectively;
　　a switching module able to be connected, especially in series, with the at least a first set of LEDs and to switch between a first position, especially an open position, in which only the second set of LEDs is supplied with electrical power, and a second position, especially a closed position, in which the at least a first set of LEDs and the second set of LEDs are supplied with electrical power simultaneously; and a module for regulating electrical current, said module being connected in series with the second set of LEDs and is adapted to switch between a regulating position during which electrical power to said second set of LEDs is adjusted to a third electrical power level so that said second set of LEDs performs a third lighting and/or signaling function and a short-circuit position during which current passing through said second set of LEDs corresponds to the level of electrical power delivered by the electrical power source to said second set of LEDs;

in which the electrical power source comprises an electrical power source providing a voltage that is adjustable to at least two different current levels corresponding to said at least two different electrical power levels, respectively;

in which the adjustable voltage electrical power source comprises a DC/DC voltage converter.

4. The control device according to claim 1, in which the module for regulating electrical current comprises a linear current source.

5. A control device for controlling a plurality of sets of LEDs, especially for an automotive vehicle, the plurality of sets of LEDs comprising at least a first set of LEDs that is associated with at least a first lighting and/or signaling function and a second set of LEDs, said second set of LEDs being capable of generating at least a second and third lighting and/or signaling function, the control device comprising:

an electrical power source able to be connected, especially in parallel, to the at least a first set of LEDs and to the second set of LEDs and to deliver at least two different electrical power levels suitable for the first lighting and/or signaling function and for the second lighting and/or signaling function, respectively;

a switching module able to be connected, especially in series, with the at least a first set of LEDs and to switch between a first position, especially an open position, in which only the second set of LEDs is supplied with electrical power, and a second position, especially a closed position, in which the at least a first set of LEDs and the second set of LEDs are supplied with electrical power simultaneously; and a module for regulating electrical current, said module being connected in series with the second set of LEDs and is adapted to switch between a regulating position during which electrical power to said second set of LEDs is adjusted to a third electrical power level so that said second set of LEDs performs a third lighting and/or signaling function and a short-circuit position during which current passing through said second set of LEDs corresponds to the level of electrical power delivered by the electrical power source to said second set of LEDs;

in which the module for regulating electrical current comprises an adjustable current source, the control device furthermore comprising a modulating module connected, especially in series, between the electrical power source and the adjustable current source, the modulating module being able to control the adjustable current source in order to adjust the third electrical power level.

6. The control device according to claim 5, wherein the regulating module delivers a signal for controlling the adjustable current source, the controlling signal being pulse-width modulated and having a duty cycle chosen so that the current source adjusts the third electrical power level.

7. The control device according to claim 1, wherein the plurality of sets of LEDs furthermore comprising a third set of LEDs able to be connected in series to the at least a first set of LEDs in order to form a fourth set of LEDs associated with a fourth lighting and/or signaling function.

8. The control device according to claim 7, wherein said control device furthermore comprises an electronic switch able to be connected, especially in parallel, to the third set of LEDs and able to switch into a position, especially a closed position, enabling control of the first lighting and/or signaling function and into a position, especially an open position, enabling control of the fourth lighting and/or signaling function.

9. A control device for controlling a plurality of sets of LEDs, especially for an automotive vehicle, the plurality of sets of LEDs comprising at least a first set of LEDs that is associated with at least a first lighting and/or signaling function and a second set of LEDs, said second set of LEDs being capable of generating at least a second and third lighting and/or signaling function, the control device comprising:

an electrical power source able to be connected, especially in parallel, to the at least a first set of LEDs and to the second set of LEDs and to deliver at least two different electrical power levels suitable for the first lighting and/or signaling function and for the second lighting and/or signaling function, respectively;

a switching module able to be connected, especially in series, with the at least a first set of LEDs and to switch between a first position, especially an open position, in which only the second set of LEDs is supplied with electrical power, and a second position, especially a closed position, in which the at least a first set of LEDs and the second set of LEDs are supplied with electrical power simultaneously; and a module for regulating electrical current, said module being connected in series with the second set of LEDs and is adapted to switch between a regulating position during which electrical power to said second set of LEDs is adjusted to a third electrical power level so that said second set of LEDs performs a third lighting and/or signaling function and a short-circuit position during which current passing through said second set of LEDs corresponds to the level of electrical power delivered by the electrical power source to said second set of LEDs;

wherein the plurality of sets of LEDs furthermore comprising a third set of LEDs able to be connected in series to the at least a first set of LEDs in order to form a fourth set of LEDs associated with a fourth lighting and/or signaling function;

in which the fourth lighting and/or signaling function is a high beam function.

10. A control device for controlling a plurality of sets of LEDs, especially for an automotive vehicle, the plurality of sets of LEDs comprising at least a first set of LEDs that is associated with at least a first lighting and/or signaling function and a second set of LEDs, said second set of LEDs being capable of generating at least a second and third lighting and/or signaling function, the control device comprising:

an electrical power source able to be connected, especially in parallel, to the at least a first set of LEDs and to the second set of LEDs and to deliver at least two different electrical power levels suitable for the first lighting and/or signaling function and for the second lighting and/or signaling function, respectively;

a switching module able to be connected, especially in series, with the at least a first set of LEDs and to switch between a first position, especially an open position, in which only the second set of LEDs is supplied with electrical power, and a second position, especially a closed position, in which the at least a first set of LEDs and the second set of LEDs are supplied with electrical power simultaneously; and a module for regulating electrical current, said module being connected in series with the second set of LEDs and is adapted to switch between a regulating position during which electrical power to said second set of LEDs is adjusted to a third electrical power level so that said second set of LEDs performs a third lighting and/or signaling function and a short-circuit position during which current passing through said second set of LEDs corresponds to the level of electrical power delivered by the electrical power source to said second set of LEDs;

in which the first lighting and/or signaling function is a low beam function, the second function is a daytime running light function and the third function is a position light function.

11. A control device for controlling a plurality of sets of LEDs, especially for an automotive vehicle, the plurality of sets of LEDs comprising at least a first set of LEDs that is associated with at least a first lighting and/or signaling function and a second set of LEDs, said second set of LEDs being capable of generating at least a second and third lighting and/or signaling function, the control device comprising:

an electrical power source able to be connected, especially in parallel, to the at least a first set of LEDs and to the second set of LEDs and to deliver at least two different electrical power levels suitable for the first lighting and/or signaling function and for the second lighting and/or signaling function, respectively;

a switching module able to be connected, especially in series, with the at least a first set of LEDs and to switch between a first position, especially an open position, in which only the second set of LEDs is supplied with electrical power, and a second position, especially a closed position, in which the at least a first set of LEDs and the second set of LEDs are supplied with electrical power simultaneously; and a module for regulating electrical current, said module being connected in series with the second set of LEDs and is adapted to switch between a regulating position during which electrical power to said second set of LEDs is adjusted to a third electrical power level so that said second set of LEDs performs a third lighting and/or signaling function and a short-circuit position during which current passing through said second set of LEDs corresponds to the level of electrical power delivered by the electrical power source to said second set of LEDs;

wherein the plurality of sets of LEDs furthermore comprising a third set of LEDs able to be connected in series to the at least a first set of LEDs in order to form a fourth set of LEDs associated with a fourth lighting and/or signaling function;

in which the fourth lighting and/or signaling function is a low beam function.

12. A control device for controlling a plurality of sets of LEDs, especially for an automotive vehicle, the plurality of sets of LEDs comprising at least a first set of LEDs that is associated with at least a first lighting and/or signaling function and a second set of LEDs, said second set of LEDs being capable of generating at least a second and third lighting and/or signaling function, the control device comprising:

an electrical power source able to be connected, especially in parallel, to the at least a first set of LEDs and to the second set of LEDs and to deliver at least two different electrical power levels suitable for the first lighting and/or signaling function and for the second lighting and/or signaling function, respectively;

a switching module able to be connected, especially in series, with the at least a first set of LEDs and to switch between a first position, especially an open position, in which only the second set of LEDs is supplied with electrical power, and a second position, especially a closed position, in which the at least a first set of LEDs and the second set of LEDs are supplied with electrical power simultaneously; and a module for regulating electrical current, said module being connected in series with the second set of LEDs and is adapted to switch between a regulating position during which electrical power to said second set of LEDs is adjusted to a third electrical power level so that said second set of LEDs performs a third lighting and/or signaling function and a short-circuit position during which current passing through said second set of LEDs corresponds to the level of electrical power delivered by the electrical power source to said second set of LEDs;

in which the first lighting and/or signaling function is a fog light function, the second function is a daytime running light function, the third function is a position light function and the fourth lighting and/or signaling function is a low beam function.

13. A control device for controlling a plurality of sets of LEDs, especially for an automotive vehicle, the plurality of sets of LEDs comprising at least a first set of LEDs that is associated with at least a first lighting and/or signaling function and a second set of LEDs, said second set of LEDs being capable of generating at least a second and third lighting and/or signaling function, the control device comprising:

an electrical power source able to be connected, especially in parallel, to the at least a first set of LEDs and to the second set of LEDs and to deliver at least two different electrical power levels suitable for the first lighting and/or signaling function and for the second lighting and/or signaling function, respectively;

a switching module able to be connected, especially in series, with the at least a first set of LEDs and to switch between a first position, especially an open position, in which only the second set of LEDs is supplied with electrical power, and a second position, especially a closed position, in which the at least a first set of LEDs and the second set of LEDs are supplied with electrical power simultaneously; and a module for regulating electrical current, said module being connected in series with the second set of LEDs and is adapted to switch between a regulating position during which electrical power to said second set of LEDs is adjusted to a third electrical power level so that said second set of LEDs performs a third lighting and/or signaling function and a short-circuit position during which current passing through said second set of LEDs corresponds to the level of electrical power delivered by the electrical power source to said second set of LEDs;

in which the switching module is connected between the electrical power source and the at least a first set of LEDs.

14. The control device according to claim 1, in which the switching module is connected between the at least a first set of LEDs and a reference potential.

15. The control device according to claim 1, in which the electrical power source comprises an electrical power source providing a voltage that is adjustable to at least two different current levels corresponding to said at least two different electrical power levels, respectively.

16. The control device according to claim 1, in which the module for regulating electrical current comprises a linear current source.

17. The control device according to claim 1, in which the module for regulating electrical current comprises an adjustable current source, the control device furthermore comprising a modulating module connected, especially in series, between the electrical power source and the adjustable current source, the modulating module being able to control the adjustable current source in order to adjust the third electrical power level.

18. The control device according to claim 1, wherein the plurality of sets of LEDs furthermore comprising a third set of LEDs able to be connected in series to the at least a first set of LEDs in order to form a fourth set of LEDs associated with a fourth lighting and/or signaling function.

19. The control device according to claim 2, wherein the plurality of sets of LEDs furthermore comprising a third set of LEDs able to be connected in series to the at least a first set of LEDs in order to form a fourth set of LEDs associated with a fourth lighting and/or signaling function.

* * * * *